United States Patent

Speelman

[15] 3,675,486
[45] July 11, 1972

[54] INSTRUMENT WITH REPLACEABLE TUBE

[72] Inventor: Irving A. Speelman, Roslyn Heights, N.Y.
[73] Assignee: Propper Manufacturing Co., Inc., Long Island City, N.Y.
[22] Filed: April 16, 1970
[21] Appl. No.: 29,186

[52] U.S. Cl. ............................. 73/401, 73/402, 128/2.05 G
[51] Int. Cl. .......................................... G01l 7/18, A61b 5/02
[58] Field of Search ................... 128/2.05 G, 2.05 M, 2.05 R; 73/402, 401; 74/519, 523

[56] References Cited

UNITED STATES PATENTS

| 3,316,766 | 5/1967 | Jones | 73/402 |
| 1,821,902 | 9/1931 | Baum | 128/2.05 G |
| 1,893,217 | 1/1933 | Babitch | 74/519 X |
| 1,863,925 | 6/1932 | Fischer et al | 74/519 X |

Primary Examiner—Kyle L. Howell
Attorney—Blum, Moscovitz, Friedman & Kaplan

[57] ABSTRACT

A sphygmomanometer having a replaceable measuring tube which has its lower end received in a seat and its upper end received in a cap which presses the measuring tube into the seat. The cap is spring-biased into engagement with the top of the measuring tube and the cap may be raised by means of a normally hidden lever to release the measuring tube for removal and replacement.

6 Claims, 6 Drawing Figures

PATENTED JUL 11 1972

INVENTOR.
IRVING A. SPEELMAN

BY
Blum, Moscovitz, Friedman & Kaplan
ATTORNEYS

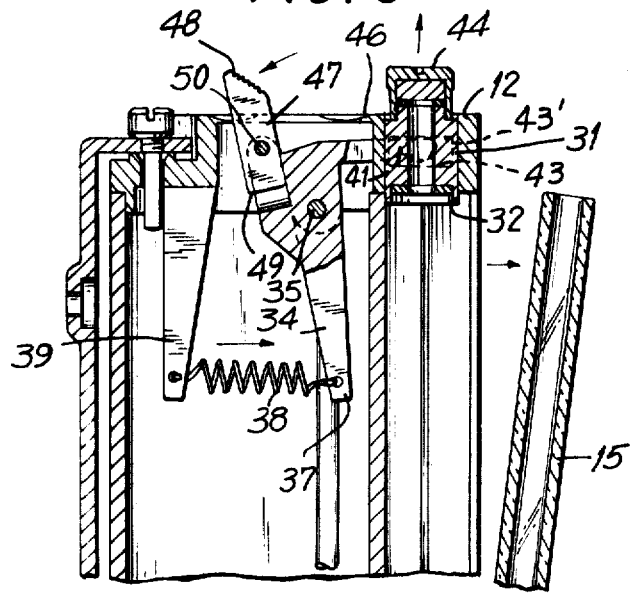
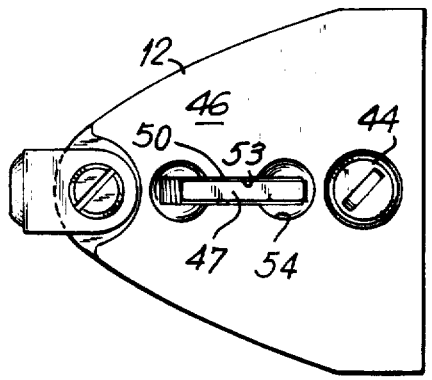
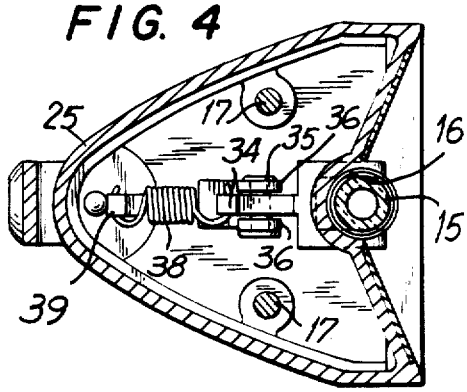
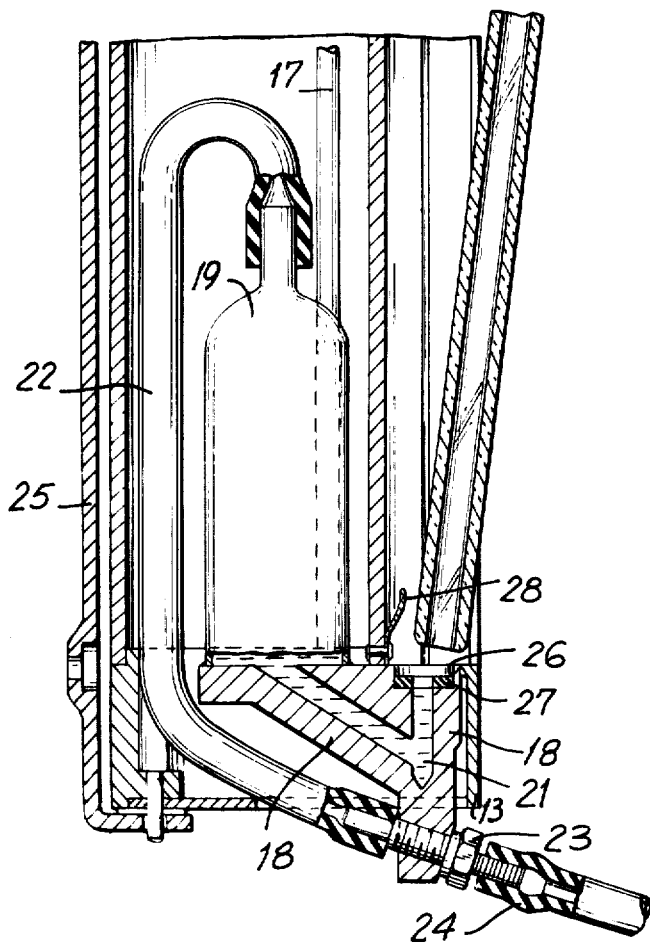

INSTRUMENT WITH REPLACEABLE TUBE

BACKGROUND OF THE INVENTION

This invention relates generally to a sphygmomanometer and more particularly to means for maintaining a replaceable measuring tube in its seat. While such means have been known in the art, prior art devices have generally lacked mechanical advantage for releasing the spring-biased means or are complex of construction and assembly and are thus generally more expensive to fabricate.

SUMMARY OF THE INVENTION

Generally speaking, in accordance with the invention, means for biasing a sphygmomanometer measuring tube into its seat is provided as a unit wholly mounted to a portion of the housing for ease of assembly and disassembly. A lever is provided for releasing the spring pressure applied to the measuring tube through the cap with the lever being normally hidden from view when in a non-operative position and readily rotated to an operative position where it can be physically operated externally of the sphygmomanometer.

Accordingly, it is an object of this invention to provide a sphygmomanometer of improved construction.

Another object of the invention is to provide an improved retaining and releasing mechanism for a sphygmomanometer measuring tube which is mounted solely on a portion of the sphygmomanometer housing.

A further object of the invention is to provide an improved releasing mechanism for a sphygmomanometer measuring tube whose operative elements are normally hidden from view.

Still other objects and advantages of the invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings.

FIG. 3 is a top plan view looking in the direction of arrows 3—3 of FIG. 2;

FIG. 4 is a sectional view taken along line 4—4 of FIG. 2;

FIG. 5 is a partial sectional view taken along line 5—5 of FIG. 2; and

FIG. 6 is a view similar to FIG. 2 but showing the measuring tube in a partially ejected position.

DESCRIPTION OF THE PREFERRED EMBODIMENT

Figures 1, 2:
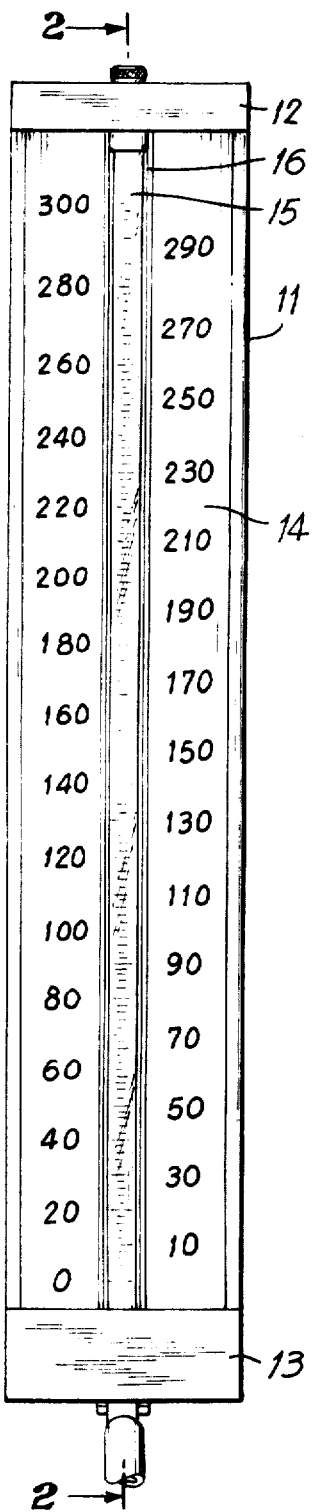
FIG. 1 is a front elevational view of a sphygmomanometer constructed in accordance with the instant invention.
FIG. 2 is a sectional view, at an enlarged scale, with the center portion broken away, taken along line 2—2 of FIG. 1.

The sphygmomanometer shown in the drawings consists generally of a tubular casing or frame 11 having end caps 12 and 13 at opposite ends thereof. The front face 14 of tubular casing 11 has suitable indicia thereon disposed on opposite sides of a replaceable measuring tube 15 carrying lines to indicate calibration. The front face is recessed as indicated at 16 to provide a generally semi-circular pocket for the measuring tube so that the calibrations on the measuring tube can be readily correlated with the numerical indicia on the front face.

Top end cap 12 threadedly receives a pair of rods 17 which extend downwardly through the tubular casing and through bottom end cap 13 and suitable fasteners (not shown) connected to the lower ends of rod 17 secure the two end caps and tubular casing in assembled position.

A block 18 is mounted to bottom end cap 13 and carries a mercury reservoir 19 located within the tubular casing and communicating at its bottom with a passage 21 which communicates with the bottom end of measuring tube 15. The top end of reservoir 19 is connected to a tube 22 which extends to a nipple 23 carried by block 18 and adapted for connection to an end 24 of the usual sphygmomanometer bulb (not shown). A bracket 25 is shown as mounted in swivel-like fashion to the sphygmomanometer. A sphygmomanometer having such a bracket is especially suitable for wall mounting. However, the construction of the instant invention is suitable for any type of sphygmomanometer and is not limited to one suitable for wall mounting.

As best seen in FIGS. 2 and 6, block 18 is provided with a seat 26 within which is mounted a gasket 27 having an aperture therethrough communicating with passage 21. The lower end of measuring tube 15 is located in seat 26 in contact with gasket 27 to provide a fluid tight connection between passage 21 and the interior of the measuring tube. A spring 28 is suitably fastened to tubular casing 11 within recess 16 immediately behind the measuring tube so as to bear against the measuring tube as shown in FIG. 2 and bias it outwardly when the holding pressure on the top of the tube is released as will hereinafter be described.

Top end cap 12 acts as a support means and carries a cylindrical pressure cup 31, slideably mounted for vertical movement within the top end cap. A seat 32 is located in he downwardly facing end of the pressure cup and a gasket 33 is located within the seat to make intimate contact with the upper end of measuring tube 15. Cup operating means will now be described. A bell crank 34 is pivotally mounted intermediate its ends by means of a pin 35 to a pair of downwardly extending lugs 36 connected to or formed as part of top end cap 12. The downwardly extending arm 37 of bell crank 34 is connected by means of a spring 38 to an arm 39 depending from top end cap 12. The other or forward end of bell crank 34 is bifurcated to define a pair of fingers 41 which are received in slots 42 on opposite sides of the side wall of pressure cup 31. The slots 42 define bearing surfaces 43 against which fingers 41 bear to bias pressure cup 31 in a downward direction against the end of measuring tube 15. Such biasing force tightly presses the opposite ends of the measuring tube against their respective seats to rigidly hold the measuring tube in the assembled position shown in FIG. 2 until it is desired to release the measuring tube. A closure cap 44 is threaded on to the top end of pressure cup 31 and is suitably vented so as to avoid creation of a back pressure or vacuum as the mercury rises and falls in the measuring tube during use of the instrument.

Bell crank 41 has an intermediate terminus 45 near the top wall 46 of top end cap 12. The intermediate terminus is bifurcated and receives therebetween an operating finger 47 having a serrated forward end 48 and a rear end 49. Operating finger 47 is pivoted between the bifurcated portions of intermediate terminus 45 by means of a pivot pin 50 whose central axis is located closer to rear end 49 than to forward end 48 and closer to the bottom 51 of the operating finger than to the top 52 thereof. The top wall 46 of top end cap 12 is provided with a slot 53 through which a portion of the operating finger extends and a depression 54 in the top wall proximate the serrated forward end permits an operator to lift or pivot the operating finger when it is in the normal position shown in FIG. 2.

It is to be noted that the normal position of FIG. 2 is an over-center position as a result of the location of pivot pin 50 whereby gravity will cause operating finger 47 to be retained in the FIG. 2 position substantially flush with the top wall 46 of top end cap 12.

When it is desired to remove the measuring tube for replacement of same for any reason, an operator lifts the operating finger and rotates it fully in the counter-clockwise direction as viewed in FIG. 2. The limit of pivot travel is reached when bottom 51 abuts intermediate terminus 45 between the bifurcated portions and, in view of the over-center position of the location of pivot pin 50, operating finger 47 will remain in an upright position with serrated forward end 48 projecting upwardly for further action.

To effect a release of the measuring tube, the operator can then rotate bell crank 34 against the biasing of spring 38 by means of pressure on operating finger 47 to thereby raise pressure cup 31 in the direction indicated by the arrow in FIG. 6 as the result of cooperation between fingers 41 and bearing surfaces 43'. When pressure has been released from the measuring tube, spring 28 acting thereagainst will pivot the measuring tube outwardly as shown in FIG. 6 where it may be grasped for removal. Replacement of the measuring tube is effected by again raising the pressure cup, inserting the lower end of the measuring tube in its seat and properly positioning the upper end of the measuring tube so that it may be contacted by its seat when the pressure cup is lowered.

With the foregoing construction, a simple mechanism is provided for holding the measuring tube in operative position and for releasing it for removal. The operating finger is normally substantially flush with the top of the apparatus in order that it is not accidentally displaced which could cause the measuring tube to jump out and break. Furthermore, the entire pressure cup and release mechanism is carried by the top end cap and may be assembled as a unit with the top end cap without connection to any of the other elements of the sphygmomanometer, thereby substantially simplifying construction and assembly of the sphygmomanometer.

It will thus be seen that the objects set forth above, among those made apparent from the preceding description, are efficiently attained, and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. An instrument comprising a frame, a replaceable tube having opposite ends, a first seat mounted on said frame and having one end of said tube positioned therein, a cup having the other end of said tube positioned therein, a cap means having said cup moveably mounted thereon, connecting means connected to said cap means and said frame for removably securing said cap means in assembled relation with said frame, and cup-operating means carried solely by said cap means for biasing said cup into engagement with said other end of said tube and for moving said cup out of engagement with said other end of said tube.

2. An instrument as claimed in claim 1 wherein said cup-operating means includes a bell crank pivotally mounted intermediate its ends on said cap means, one end of said bell crank being in operative engagement with said cup for moveably mounting said cup with respect to said cap means and spring-biasing means acting between said bell crank and said cap means for biasing said cup in one direction while permitting said cup to be moved against the biasing force of said spring-biasing means in an opposite direction.

3. An instrument as claimed in claim 2 wherein said one end of said bell crank is bifurcated to define a pair of fingers and said cup is provided with bearing surfaces for engagement by said fingers.

4. An instrument as claimed in claim 3 wherein said cup-operating means includes an operating finger pivoted to said bell crank and rotatable between an operative position projecting outwardly of said cap means and an inoperative position substantially withdrawn within said cap means.

5. An instrument as claimed in claim 4 wherein the pivot of said operating finger to said bell crank is located in over-center relationship with respect to said operating finger, whereby said operating finger will be normally biased by gravity into said substantially withdrawn position.

6. An instrument as claimed in claim 5 wherein said cap means has a top surface and a slot extends through said cap means from the top surface thereof, said operating finger being positioned substantially within said slot, said operating finger having a top surface when in the substantially withdrawn position substantially flush with the top surface of said cap means, said operating finger having a forward end and said top surface of said cap means having a depression proximate said forward end of said operating finger whereby to permit said forward end to be physically grasped for pivoting thereof when said operating finger is in said substantially withdrawn position.

* * * * *